Oct. 8, 1929.   J. M. PRICE   1,730,478
SEALING MEANS FOR PISTONS
Filed Sept. 12, 1927

INVENTOR.
John M. Price
BY A. J. O'Brien
ATTORNEYS.

Patented Oct. 8, 1929

1,730,478

UNITED STATES PATENT OFFICE

JOHN M. PRICE, OF ARVADA, COLORADO

SEALING MEANS FOR PISTONS

Application filed September 12, 1927. Serial No. 218,990.

This invention relates to improvements in sealing means for relatively movable members and relates more particularly to an improved sealing means for pistons.

In engines of all kinds and in pumps the structure comprises a cylinder in which there is mounted for reciprocation a piston. The piston as a rule reciprocates at a high rate and must therefore move quite freely and at the same time the piston must be provided with means for making a gas tight seal with the cylinder wall. For this purpose it is customary to provide the piston with one or more grooves within which are located piston rings.

Many attempts have been made to improve the seals between the pistons and the cylinder walls but as a rule these attempts have related to modification in the construction of the rings themselves.

It is the object of this invention to produce a seal that shall be radically different from the usual seals employing the conventional rings and which will be so constructed that it will automatically compensate for wear.

My invention, briefly described, consists in providing the piston surface with one or more wide shallow grooves whose bottom surface or surfaces are tapered and to provide each of these grooves with a sealing ring consisting of a helical metal strip that is adapted to fit into the groove, and which has a plurality of turns. The inner surface of the metal strip makes an angle with the outer surface so that it will fit the conical bottom of the groove and so that the outer surface will form a true cylindrical surface when it is in place. The helical ring is of such length that when it is in place in the groove it substantially fills the latter with the exception of such areas as are necessary to take care of the unequal expansion of the piston and the ring.

Having thus briefly described the invention I will now proceed to describe the same in detail and reference for this purpose will now be had to the accompanying drawing in which the invention has been illustrated and in which.

Figure 3:
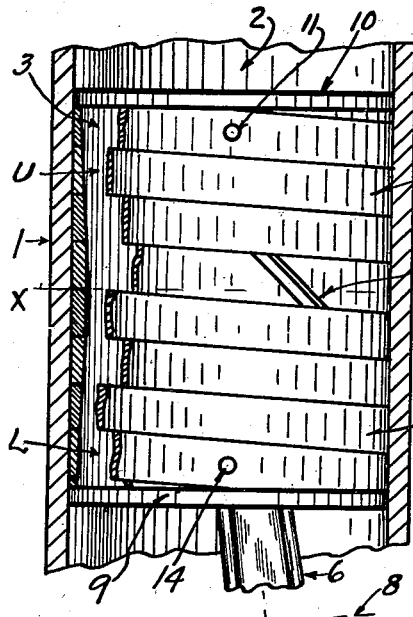
Fig. 3 is a view similar to that of Fig. 1 and illustrates a modified construction in which the outer piston surface tapers from each end towards the center and in which the ring is made in two parts, portions of the ring being broken away to better disclose the construction.
Figure 1:
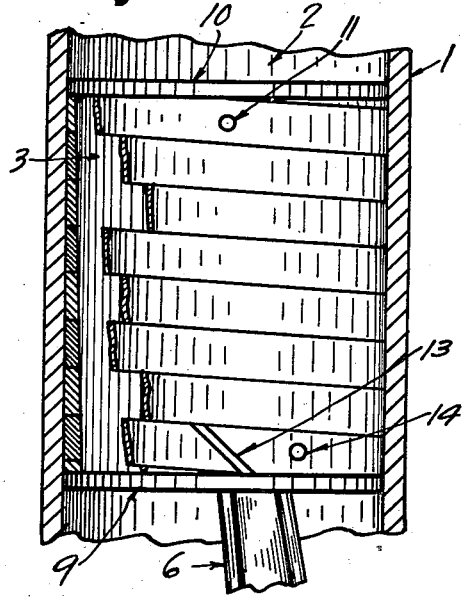
Fig. 1 is a longitudinal diametrical section through a cylinder showing my improved piston in place therein, portions of the helical ring being broken away to better disclose the construction.
Figure 2:
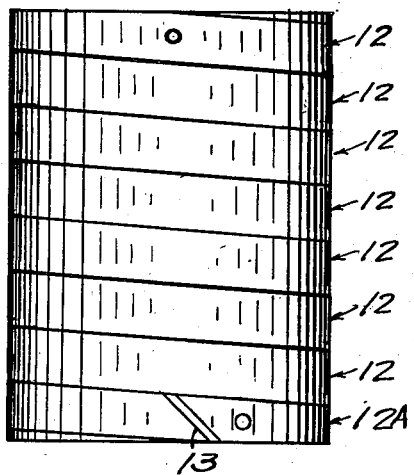
Fig. 2 is a side elevation showing the helical ring removed from the piston and shows the manner in which the coils enlarge when the ring is free to assume its normal shape.

Numeral 1 indicates a member having a cylindrical opening whose wall has been designated by numeral 2. Mounted for reciprocation in the cylindrical opening is a hollow piston 3. The inner surface of this piston has diametrically opposed lugs 4 provided with openings for the reception of the ends of the wrist pin 5. A connecting rod 6 has its upper end secured to the wrist pin in the usual manner. The other end of the connecting rod is secured to the crank pin 7 of the crank shaft 8 (Fig. 3). When the crank shaft rotates the piston will be reciprocated. The outer surface of the piston is provided with end flanges 9 and 10 whose diameter is slightly less than that of the cylindrical opening. In the embodiment shown in Fig. 1 that portion of the outer piston surface that lies between flanges 9 and 10 has a uniform taper and has a larger diameter directly beneath the flange 10 than directly above flange 9. A pin 11 projects radially from the piston directly below flange 10 and is adapted to engage in an opening in the upper turn of the helical ring which will now be described. The ring may be made from any suitable material and by any suitable method and consists of a helix composed of several turns each of which has been designated by numeral 12 (Fig. 2). The helical ring is so constructed that it will fit in the groove or depression between flanges 9 and 10. When it is in place the upper and lower ends, which have been cut so that their planes intersect the axis of this helix at right angles, contact with the shoulders formed by flanges 9 and 10, and the inner surface rests against the outer surface of the piston. From Fig. 1 it will be observed that when the helical ring is in place its inner surface is conical while its outer surface is cylindrical. The lower turn of the helix which has been designated by numeral 12A in Fig. 2 is separated from the upper part of the helix by a diagonal cut 13 and is secured to the piston by being welded or brazed to it, or it may be held by a pin 14. When the ring is in place its upper end is anchored to the piston by means of the pin 11 and fills the recess or groove in the piston quite completely. The tendency of the ring to enlarge its diameter keeps its outer surface always in contact with the wall of the cylindrical opening and since the free end of the ring is in contact with the inclined surface of the stationary turn 12A (Fig. 1) or with the adjacent free end of the other portion of the ring (Fig. 3) the expansion and contraction of the ring will cause it to move downwardly or upwardly along the conical surface of the piston and thereby maintain the metal surfaces in close contact whereby, when the parts are covered with an oil film, an almost perfect seal is obtained. If the cylinder and the piston expand unequally the resiliency of the ring causes it to adjust itself so as to produce a close fit. The presence of the gap 13 permits the lower end of the ring to move so as to effect the necessary adjustments.

Figure 4:
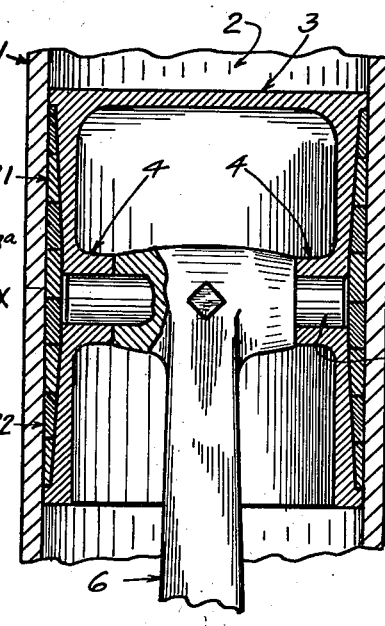
Fig. 4 is a longitudinal diametrical section of the piston shown in Fig. 3.

In Figs. 3 and 4 I have illustrated a modified construction in which the outer surface of the piston tapers in both directions from the center plane x—x which is of the smallest diameter. Between plane x—x and the shoulders formed by the flanges 9 and 10 the piston surface is conical and is therefore composed of the two conical sections U and L which represent respectively the upper and the lower section. The ring is made in two parts, the upper part being designated by R¹ and the lower by R². The upper and lower end of each part terminates in a circular edge that lies in a plane that is perpendicular with the axis of the ring, and which therefore fits against the flat shoulders formed by the flanges 9 and 10. Each section is held in place by a pin. The two parts of the ring are separated by a diagonal cut 13 which permits expansion. The outer surface of the piston is somewhat hour glass shaped and the inner surfaces of the ring sections are tapered to fit. The resiliency of the rings tends to expand them because they are so constructed that when they are unrestrained they will assume a diameter larger than the diameter of the opening in the cylinder, and therefore they will always make a close fit with both the cylinder walls and the piston surface.

Figure 5:
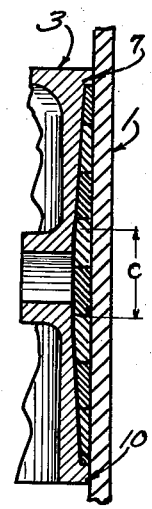
Fig. 5 is a section through one wall of a piston that is constructed with a short cylindrical central surface and two conical surfaces.

In Fig. 5 I have shown a slightly modified construction which differs from that shown in Figs. 3 and 4 in this, that the two conical portions U and L of the piston are separated by a cylindrical band C and the adjacent ends of the rings have their inner surfaces provided with correspondingly cylindrical portions.

Owing to the fact that the inner surface of the ring is tapered in the same manner as the piston so that it will have a firm contact with the latter and at the same time have its outer surface in contact with the inner surface of the cylinder, oil is prevented from passing and this construction therefore prevents to a great extent the formation of carbon. The oil film between the edges and the helical turns and between the bottom of the ring and the groove as well as the oil between the outer surface of the ring and the cylinder forms a very efficient seal.

It will be observed from the above that I have produced a sealing means for relatively movable cylindrical surfaces which will automatically compensate for unequal expansion and for wear and which presents a large contact surface to the opposing part.

In the drawing the thickness of the rings has been exaggerated in order to make the construction more obvious. The rings are made quite thin so as to be very flexible but otherwise the showing is in accordance with the actual construction.

Having described the invention what I claim as new is:

1. A piston adapted to be mounted for reciprocation in a cylinder, said piston having a wide groove in its outer surface the bottom surface of said groove being conical, a sealing ring located in said groove, said ring consisting of a thin flat metal ribbon formed into a cylinder helix of several turns and of such size and shape that it will fit the groove in the piston, the inner surface of said helix being conical and adapted to fit the conical surface of the piston, and the outer surface cylindrical, and means for anchoring the thinner end of the ring to the piston.

2. A piston adapted to be mounted for reciprocation in a cylinder, said piston having a wide groove in its outer surface the bottom surface of said groove being conical, a sealing ring located in said groove, said ring consisting of a thin flat metal ribbon formed into a cylindrical helix of several turns and of such size and shape that it will fit the groove in the piston, the inner surface of said helix being conical and adapted to fit the conical surface of the piston, and the outer surface cylindrical and means for attaching the thinner end of the said ring to the piston.

3. A piston adapted to be mounted for reciprocation in a cylinder, the outer surface of said piston being provided with a wide shallow groove comprising two conical surfaces whose smaller diameters are near the middle of the groove, a two-part sealing ring located in the groove, each part of said ring comprising a helix of several turns whose edges contact, the inner surface of each helical ring being conical so as to fit the conical surface of the groove section with which it is associated, the outer surface being cylindrical and means for anchoring the thinner end of each ring section to the piston whereby the other ends may move so as to permit the ring to move upwardly so as to compensate for wear.

In testimony whereof I affix my signature.

JOHN M. PRICE.